United States Patent [19]

Kerr et al.

[11] 4,061,717

[45] Dec. 6, 1977

[54] DIRECTED CRYSTALLIZATION OF SYNTHETIC ALUMINOSILICATES

[75] Inventors: George T. Kerr, Lawrenceville; Louis D. Rollmann, Princeton, both of N.J.

[73] Assignee: Mobil Oil Corporation, New York, N.Y.

[21] Appl. No.: 697,646

[22] Filed: June 18, 1976

Related U.S. Application Data

[63] Continuation-in-part of Ser. No. 511,902, Oct. 3, 1974, abandoned.

[51] Int. Cl.$^2$ .............................................. C01B 33/28
[52] U.S. Cl. ................................ 423/329; 252/455 Z; 260/2 S; 260/2.1 R
[58] Field of Search .................. 423/328, 329; 260/448 C, 455 Z, 2 S, 2.1 R, 2.2 R

[56] References Cited

U.S. PATENT DOCUMENTS

| | | | |
|---|---|---|---|
| 3,054,657 | 9/1962 | Breck | 423/328 |
| 3,306,922 | 2/1967 | Barrer et al. | 260/448 |
| 3,947,482 | 3/1976 | Albers et al. | 423/329 X |

OTHER PUBLICATIONS

Aiello et al., "J. Chem. Soc. (A)," 1970, pp. 1470–1475.
Barrer et al., "J. Chem. Soc.," 1959, pp. 195–208.

*Primary Examiner*—Edward J. Meros
*Attorney, Agent, or Firm*—Charles A. Huggett; Michael G. Gilman; John A. Cooper

[57] ABSTRACT

Synthetic crystalline aluminosilicate zeolites are crystallized from an aqueous reaction mixture comprising sources of alkali metal oxide, silicate, aluminate and an ionene or ionomer which contains positively charged nitrogen atoms in such quantity as to satisfy some of the cationic sites of the eventual zeolite. The presence in the reaction mixture of such a polymer serves to direct crystallization of the zeolite, giving rise to the formation of large pore zeolites under conditions where small pore zeolites would otherwise result, to the formation of more siliceous zeolite than would otherwise result, and to the formation of certain species of zeolite essentially free of stacking faults, the crystallization of which has not heretofore been possible.

20 Claims, No Drawings

DIRECTED CRYSTALLIZATION OF SYNTHETIC ALUMINOSILICATES

CROSS REFERENCE TO RELATED APPLICATIONS

This application is a continuation-in-part of our co-pending application Ser. No. 511,902 filed Oct. 3, 1974, now abandoned.

BACKGROUND OF THE INVENTION

1. Field of the Invention

This invention is concerned with synthesis of crystalline aluminosilicate zeolites.

2. Description of the Prior Art

A number of synthetic crystalline zeolites have previously been prepared. They are distinguishable from each other and from naturally occurring zeolites on the basis of composition, crystal structure and sorptive properties. The existence of a number of zeolites having similar but distinguishable properties advantageously permits the selection of a particular member having optimum properties for a particular use.

Such synthetic crystalline aluminosilicates are ordinarily prepared initially in the alkali metal form of the crystal; the process of preparation involving heating, in aqueous solution, of an appropriate mixture of oxides, or of materials whose chemical composition can be completely represented as a mixture of oxides: alkali metal oxide, silica, alumina and water, at a temperature of approximately 100° C. for a period of from 15 minutes to 90 hours or more. The product which crystallizes within this hot mixture is separated therefrom and water washed. The aluminosilicate may then be activated by heating until dehydration is attained. It has also heretofore been known to synthesize zeolites from systems containing quaternary ammonium ion, in particular, the tetramethylammonium (TMA) cation. Other types of organic bases have been employed including tetraethylammonium (TEA) and large cations derived from 1,4-diazabicyclo - (2.2.2.) octane. The latter are particularly described in U.S. Pat. No. 3,459,676 dealing with synthesis of zeolite ZK-20. Representative of zeolites crystallized from a reaction mixture containing tetramethylammonium cations is ZK-4 described in U.S. Pat. No. 3,314,752. Crystalline aluminosilicate zeolite, of course, consist of a three-dimensional lattice formed of $AlO_4$ and $SiO_4$ tetrahedra cross-linked by the sharing of oxygen atoms, the negative charge on the $AlO_4$ tetrahedra being balanced by the inclusion in the lattice of cationic charge equivalent to that on the lattice aluminum.

SUMMARY OF THE INVENTION

In accordance with the present invention at least part of that cationic charge is furnished by positively charged nitrogen atoms forming part of an ionene or ionomer present in the reaction mixture from which the zeolite crystallises. For the purposes of the present specification an ionene is defined as a polymer the backbone of which periodically contains a positively charged nitrogen atom, whilst an ionomer is defined as a polymer the backbone of which bears side-chains which contain a positively charged nitrogen atom. Useful polymers include those in which the nitrogen acquires its positive charge as a consequence of presence in the reaction mixture, being neutral (e.g. part of an amino group) in different environments.

Heretofore in the zeolite synthesis are it has been standard practice to provide for satisfaction of the negative charge on the $AlO_4$ tetrahedra of the lattice of the eventual crystal by inclusion in the reaction mixture of monatomic or monovalent cations.

In addition to balancing the negative charge such cations function as local templates directing crystallisation to aluminosilicates of varying structures.

The advantages of the use of a cationic entity in which according to the present invention, such cations are fixed in a polymeric array, are manifold. First and foremost, the fact that these charges are associated with nitrogen atoms which (in the case of ionenes) occur periodically in groups pendant to a polymer backbone determines that the crystallisation of zeolite proceed in such manner that its lattice structure accommodate that backbone. The spatial extent of the backbone of the polymers in question (radially) is such that synthesis according to the invention thus results in zeolites having channels defined by rings of at least 8 tetrahedra. The crystallization is thus directed away from dense structures in favour of those more open structures known, by virtue the accessibility of their interior to relatively large sorbate molecules, to possess utility as sorbents or catalysts.

A further consequence of the fact that the ionenes and ionomers have significant spatial extent is that in certain systems the presence of the polymer in the nucleating lattice results in exclusion of other cations, such as sodium, which may be present in the reaction mixture. In consequence the zeolite crystallizes in a more siliceous form, the cation deficiency being reflected in a corresponding aluminum deficiency. In many industrial applications of zeolites as catalysts the more siliceous forms of a zeolite are preferred. Conversely, a given zeolite may be obtained in its typical form (with respect to silica/alumina ratio) from a reaction mixture which in the absence of the polymer would be insufficiently siliceous to yield it.

A corollary of the openness of structure referred to above is that it is in some instances possible by operation in accordance with the invention to bring into existence structures which have not previously been obtainable in synthesis. Gmelinite, for example, possesses a lattice structure which has been known for many years and which gives rise to channels about 7A in diameter. Although this diameter is more than sufficient to admit cyclohexane copiously, synthetic gmelinites have shown very low cyclohexane sorption capacity because they have invariably been penetrated by intergrowths of chabazite which introduce into the 7A channels an obstruction through which the cyclohexane molecule cannot pass. The use of polymeric cations as described herein permits crystallization of gmelinite only, from the chabazite-gmelinite system, the small chabazite channels being evidently too small to form themselves around the polymer backbone. There results a synthetic gmelinite which, unlike any previously reported, manifests its theoretical cyclohexane sorption capacity.

The polymers contemplated for use in the present synthesis method are characterized by a molecular weight of at least about 300 and of up to about 100,000, generally within the approximate range of 500 to 5000. The preferred ionenes used constitute the reaction product of (1) a dihalide having the formula:

$$X - CH_2 - Q - CH_2 - X$$

where X is a halogen selected from the group consisting of chlorine, bromine and iodine and Q is $C_6H_4$, $C_{10}H_6$, $C_{12}H_8$ or $(CH_2)_p$ where $p$ is 1 to 18 and (2) a ditertiary amine selected from the group consisting of (a) those having the unit structure:

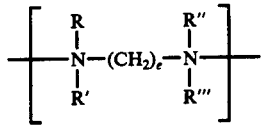

where R, R', R" and R'" are alkyl groups of from 1 to 6 carbon atoms and $e$ is a number from 2 to 20, (b) 1,4-diazabicyclo [2.2.2] octane, (c) an aromatic bridged ditertiary amine such as N, N, N', N'-tetramethyl benzidine, and (d) a heterocyclic diamine such as 1,2-bis(4-pyridyl) ethylene or 4,4'-bipyridyl. With the ditertiary amines of group (a), the resulting ionenes have the following general formula:

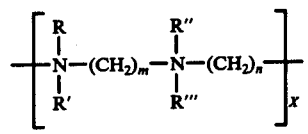

where R, R', R" and R'" are alkyl groups of from 1 to 6 carbon atoms, $m$ (derived from the diamine) is 2 to 20, preferably 4 to 6, $n$ (derived from the dihalide) is 3 to 20, preferably 4 to 6, the sum of $m$ and $n$ being greater than 5 but not greater than 40 and X is a number of from 1 to about 1000. The groups $(CH_2)_m$ and $(CH_2)_n$ may be either linear or branched with the restriction that the nitrogen atoms in the ditertiary amine must be separated by at least 2 carbon atoms and the halogen atoms in the dihalide must be separated by at least 3 carbon atoms. R, R', R" and R'" may be the same or different alkyl groups. The capping or terminal groups of the polymer will normally be halide or the hydrolysis products thereof, e.g. hydroxy or unreacted ditertiary amine.

Of the dihalides employed, the dibromides are particularly preferred due to ease of reaction with the ditertiary amine reactant. Somewhat less preferred are the diiodides and the dichlorides, the latter being less reactive and requiring use of a higher temperature for polymerizaton than either the dibromides or diiodides.

Typical of the ionenes employed are:

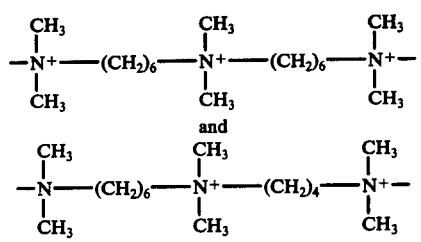

Another ionene useful in the method of the invention is:

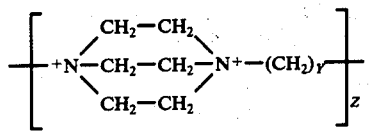

where Y is a number of from 3 to 10, preferably 4 to 6 and Z is a number from 1 to about 1000.

Other suitable ionenes include:

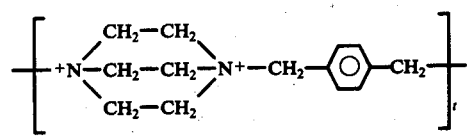

where $t$ is a number from 1 to about 1000 and

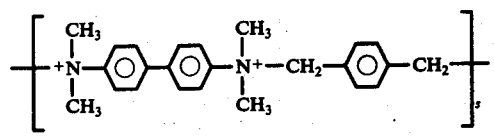

where $s$ is a number from 1 to about 1000 and

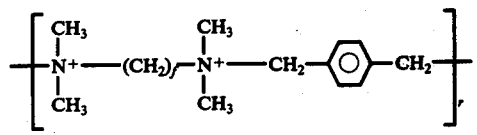

where $f$ is a number of from 2 to 20, preferably 4 to 6, and $r$ is a number from 1 to about 1000.

The ionomers useful in carrying out the invention may contain the necessary positively charged nitrogen atom (or its precursor) in any of a variety of differently structured pendant groupings. When the nitrogen forms part of a pyridinium grouping we contemplate, as preferred ionomers, the poly (2- and 4- vinyl pyridinium) salts, which are formed by mineral acid protonation or alkyl halide quaternization of either monomer. The repeating unit of the resulting ionomer (for the 4-salt) can be represented:

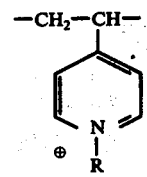

in which R is hydrogen or akyl of 1 to 6 carbon atoms. The structure for the 2-salt is analogous. In this particular case it is believed that there can result from the polymerization a polymer which is both ionene and ionomer, the pyridinium group occurring both in backbone and pendant groupings.

A preferred ionomer in which the positively charged nitrogen forms part of a pendant conventional quaternary group is obtained by quaternization of a poly (epichlorohydrin) with a trialkylamine such a trimethylamine. A repeating unit of the following configuration results:

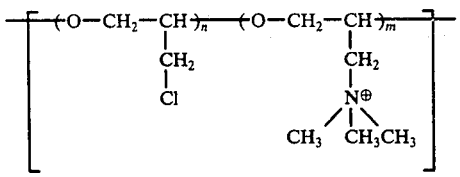

in which n and m are typically 0-10 and 1 respectively.

The invention thus resides in a method of synthesising a crystalline aluminosilicate zeolite from an aqueous reaction mixture containing sources of silicate of aluminate and of cations in quantity at least equivalent to the alumina in said mixture, and is characterized by the fact that said source of cations comprises a polymer selected from ionenes and ionomers of such equivalent weight, and in such quantity, as to balance the negative charge on 1 to 100 percent of the aluminum-containing tetrahedra of the resulting zeolite with positively charged polymer nitrogen atoms. In most instances 10 to 90 percent of the aluminum-containing tetrahedra have their charge balanced by the polymer nitrogen, preferably 40 to 70 percent.

It is a particular embodiment of the present invention that the zeolite be prepared from reaction mixtures containing an ionene or ionomer polymer of the type defined hereinabove by heating in an aqueous solution a mixture of the oxides of materials whose chemical composition can be completely represented as a mixture of the oxides: $Na_2O$, $SiO_2$, $Al_2O_3$, $H_2O$ and $M_2O$ where the latter is the sum of $Na_2O$ and the quaternary ammonium polymer expressed as the oxide. Generally, a colloidal silica sol or an alkali metal silicate serves as the source of silica and an alkali metal aluminate as the source of alumina. An alkali metal hydroxide is suitably used as the source of the alkali metal ion. Heating is suitably carried out at a temperature of between about 80° C. and about 200° C. until the desired crystalline zeolite is obtained, generally for a period of time ranging from about 10 hours to 75 days and preferably between about 2 and about 15 days. The composition of the reaction mixture, expressed in terms of mole ratios of oxides, falls within the following ranges:

| | Broad Range | | | Preferred Range | | |
|---|---|---|---|---|---|---|
| $SiO_2/Al_2O_3$ | 5 | to | 100 | 10 | to | 60 |
| $Na_2O/M_2O$ | 0.2 | to | 0.995 | 0.5 | to | 0.95 |
| $H_2O/OH^-$ | 10 | to | 200 | 15 | to | 40 |
| $OH^-/SiO_2$ | 0.05 | to | 2 | 0.3 | to | 1.3 |

The product which crystallizes from the hot reaction mixture is separated, suitably by centrifuging or filtration, washed with water until the effluent wash water in equilibrium with the zeolite has a pH of from about 8 to about 13. The material, so obtained, is thereafter activated by heating in an inert atmosphere e.g. nitrogen, helium, argon or mixtures of these gases containing less than 5 percent by volume of oxygen. Heating is conducted at a temperature between about 200° and 600° C. During the latter stages of this thermal treatment oxygen concentration of the atmosphere may be raised up to 20 volume percent (air), providing care is exercised to prevent runaway exothermic oxidation of the polymer residue. This thermal treatment serves to decompose and effect removal of the polymer as such from the zeolite yielding hydrogen cation in its place.

The resulting hydrogen alkali metal crystalline aluminosilicate zeolite may undergo ion exchange with ammonium or metal cation such as calcium, magnesium, manganese, vanadium, chromium, cerium, aluminum, lanthanum, praseodymium, neodymium, samrium and other rare earths, as well as solutions containing mixtures of these ions and mixtures of the same with other ions such as ammonium.

As has been previously stated, the zeolites prepared utilizing the present technique are useful as adsorbents. Such may be produced in any suitable form. For example, a column of powder zeolite material may afford excellent results as may a pelleted form obtained by pressing into pellets a mixture of the zeolite and a suitable bonding agent, such as clay.

We have mentioned that use of a polymer according to the invention directs a reaction mixture toward yielding relatively large-pore zeolites, and this phenomenon is often observed in instances where, in the absence of the polymer, the mixture would yield a small-pore zeolite. Thus we have obtained mordenite from a reaction mixture which would have yielded analcite, simply by incorporating into the analcite reaction mixture an ionene in such quantity as to furnish, in terms of its component positively charged nitrogen atoms, about 30 percent of the total cationic complement of the reaction mixture. In further similar syntheses, the relatively large-pore ZSM-12 was obtained in preference to ZSM-5, polymer nitrogen furnishing about 20–50 percent of total reaction mixture cation complement; zeolite Y was obtained in preference to zeolite P, the relevant percentage being about 10–20; and gmelinite was obtained in preference to chabazite, the relevant percentage being about 20.

The quantity of polymer required to be present in the reaction mixture in order to influence crystallization and bring about the beneficial results of the invention may vary widely. Although the invention is not restricted to our theory we believe that the polymer acts as a template for zeolite nucleation, determining at least the pore size of the lattice which initially assembles in the reaction mixture. In some systems this initial lattice will be the only one which proliferates, and a relatively small amount of polymer serves to direct the entire crystallization, whilst in others it appears that a continuous polymer involvement is required for crystallization to proceed and relatively large amounts of polymer are required. In all systems, however, crystallization is inhibited by the presence of very high concentrations of polymer, such as in some cases equivalence to the remaining cations in the reaction mixture. Depending on the particular polymer employed, and the temperature, we find that the optimum crystallization-directing effect of the polymer is observed when the polymer/total cation equivalence ratio in the reaction mixture is from about 0.07 to about 0.45.

We hve mentioned that the present invention makes possible synthesis of gmelinite free of chabazite. The well-known zeolites are both formed from the same building unit, the so-called "gmelinite cage", but the manner of assembly of the cages differs in the respective lattices: in the chabazite lattice they are assembled so as to give rise to channels of no more than about 4A in diameter whereas in gmelinite the largest channels are about 7A in diameter. The idealized unit cell contents are $Ca_2 [(AlO_2)_4 (SiO_2)_8]$. 13 $H_2O$ for chabazite and $Na_8 [(AlO_2)_8 (SiO_2)_{16}]$. $24H_2O$ for gmelinite; obviously the cations can be exchanged, and the Si/Al ratio can vary, for instance from about 1.5 to 4 in either zeolite. The principal d-spacings in the respective x-ray powder diffraction patterns are:

TABLE A

| CHABAZITE | | GMELINITE | |
|---|---|---|---|
| d(A°) | I/Io | d(A°) | I/Io |
| 9.39 | 89 | 11.91 | 100 |
| 6.94 | 22 | 7.68 | 5 |
| 6.37 | 30 | 5.12 | 18 |
| 5.58 | 76 | 5.02 | 53 |
| 5.01 | 44 | 4.50 | 9 |
| 4.69 | 2.4 | 4.11 | 42 |
| 4.35 | 100 | 3.44 | 7 |
| 4.06 | 5.5 | 3.22 | 25 |
| 4.01 | 7.5 | 2.98 | 27 |
| 3.59 | 4.5 | 2.92 | 8.4 |
| 3.47 | 9.2 | 2.85 | 16 |
| 3.19 | 10.7 | 2.69 | 21 |
| 3.13 | 6.5 | 2.60 | 2.3 |
| 2.95 | 88.4 | 2.56 | 2.0 |
| 2.92 | 13 | 2.40 | 2.7 |
| 2.90 | 36 | 2.29 | 3.5 |
| 2.85 | 6.6 | 2.08 | 11 |
| 2.79 | 10 | 2.05 | 3.2 |
| 2.71 | 2.9 | 1.83 | 3.1 |
| 2.69 | 5 | 1.81 | 3.3 |
| 2.62 | 14 | 1.79 | 3.1 |
| 2.59 | 9.3 | 1.73 | 2.0 |
| 2.51 | 24 | 1.72 | 5.3 |
| 2.37 | 3.2 | 1.67 | 2.5 |
| 2.31 | 6.4 | 1.58 | 2.1 |
| 2.29 | 5.3 | | |
| 2.22 | 4.5 | | |
| 2.14 | 2.2 | | |
| 2.07 | 5.1 | | |
| 2.03 | 2.5 | | |
| 1.92 | 4.4 | | |
| 1.88 | 4.4 | | |
| 1.86 | 3.3 | | |
| 1.81 | 15 | | |
| 1.79 | 2.1 | | |
| 1.73 | 12 | | |
| 1.70 | 5.5 | | |
| 1.67 | 3.6 | | |
| 1.66 | 3.4 | | |
| 1.65 | 3.3 | | |
| 1.56 | 6.3 | | |
| 1.53 | 3.4 | | | as calculated from the known structural data. I/Io is the ratio of the height of a peak to that of the highest peak.

In practice gmelinite rarely, if ever, occurs free of chabazite. The consequence is that its sorptive properties become essentially those of chabazite (through obstruction of the 7A gmelinite channels by sections of chabazite where the channel diameter is only 4A) and that actual reports of the x-ray powder diffraction pattern differ from the true pattern calculated from the ideal structure (and furnished above). Thus, gmelinite is reported as capable of sorbing no molecule larger than propane.

The structural features of chabazite which bring about this occlusion manifest themselves in the intense x-ray powder diffraction reflections at d-spacings of 9.39, 5.58 and 4.35 A (corresponding to the 101, 201 and 220 crystal planes: by contrast, the corresponding crystal planes of gmelinite give rise to reflections at d-spacings of 7.69, 5.067 and 3.44 A). The presence of one or more of these intense chabazite reflections in the x-ray power diffraction pattern of a sample of "gmelinite" establishes chabazite intergrowth in that sample and inevitably connotes inability of the sample to sorb molecules larger than propane in any significant quantity.

By proceeding in accordance with the present invention gmelinite may be synthesised free, or substantially free, of chabazite. There is no record of such synthesis having previously been successfully performed. The measure of our success is that the gmelinite we synthesise is normally entirely clear or has an I/Io ratio of less than 2 at the three d-spacings ascribable to chabazite identified above; and that is sorbs more than 3, usually more then 5, and in many instances up to 8 weight percent of cyclohexane, a molecule sorbed to less than 1% by previous synthetic gmelinites.

In addition to affording zeolite species heretofore unattainable, the method of the invention permits the production of known zeolites such a mordenite and zeolite Y in higher yield than was possible utilizing previous synthesis methods.

Mordenite can be obtained, in accordance with the present invention, in a more highly siliceous form than that reported for large-port conventionally prepared mordenites, namely with a silica/alumina ratio of the order of 18 instead of the usual 10–12. Using the polymer defined in Examples 1–7 herein mordenite can be obtaind from reaction mixtures of the composition:

$SiO_2/Al_2O_3 = 15 - 40$
$H_2O/OH = 10 - 50$
$OH/SiO_2 = 0.5 - 1.2$
$M_2O/SiO_2 = 0.4 - 1.0$
$R_2O/M_2O = 0.1 - 0.5$ (R is defined for the purposes of this specification and the claims therein a one equivalent of polymer cation).

Zeolite ZSM-12 can be obtained from reaction mixtures less siliceous than conventional (and in a less siliceous form than conventional) according to the invention. (This zeolite, and its preparation, is described in U.S. Pat. No. 3,832,449). Using the polymers defined in Examples 43–51 hereof one can obtain zeolite ZSM-12 from reaction mixtures of the composition:

$SiO_2/Al_2O_3 = 20 - 40$
$H_2O/OH = 50 - 150$
$OH/SiO_2 = 0.2 - 0.8$
$M_2O/SiO_2 = 0.2 - 0.7$
$R_2O/M_2O = 0.2 - 0.5$ (M is R+ other cations, e.g. alkali metal). If non-polymeric organic cations of similar structure are employed, many such reaction mixtures would yield ZSM-5.

Gmelinite free of chabazite can be obtained, using the polymers defined in Examples 1 – 7, from reaction mixtures having the following composition:

$SiO_2/Al_2O_3 = 10 - 75$
$H_2O/OH = 10 - 50$
$OH/SiO_2 = 0.7 - 1.5$
$M_2O/SiO_2 = 0.3 - 0.9$
$R_2O/M_2O = 0.01 - 0.3$ (where R and M are defined as previously).

DESCRIPTION OF SPECIFIC EMBODIMENTS

The following examples will serve to illustrate the method of the invention without limiting the same.

EXAMPLES 1–7

The polymer used in these examples was prepared from 1,4-diazabicyclo [2.2.2] octane (Dabco) and 1,4-dibromobutane and had the following structure:

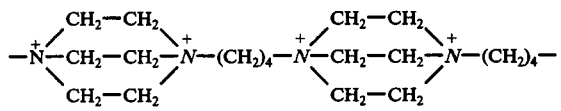

More particularly, a solution of 208 grams of 1,4-diazabicyclo [2.2.2] octane (1.85 moles) was added to 400 grams of dibromobutane (1.85 moles), each of which was dissolved in 1 liter of a 4:1 volume mixture of dimethylformamide:methanol. The mixture was stirred and cooled to maintain the temperature below 35° C. After one week, a white product identified as the above polymer with an average molecular weight in the approximate range of 1,000–10,000 had formed. This product was filtered, ether washed and air dried.

Reaction mixtures were prepared by mixing a 30 weight percent colloidal silica sol with aqueous solutions of the above polymer and the sodium hydroxide and sodium aluminate. The reaction mixture had a composition defined by the following mole ratios:

$SiO_2/Al_2O_3 = 30$
$OH^-/SiO_2 = 1.1$
$H_2O/OH^- = 17$

The ratios $M_2O/SiO_2$ and $(R^+/Na^+ + R)$ were varied as shown in Table I below. The latter ratio is the mole fraction ammonium cations $(R^+)$, added as bromide and $M_2O$ is the sum of $Na_2O$ and quaternary ammonium polymer expressed as the oxide. Crystallization, conducted in teflon containers without stirring, was essentially complete after 7 days at 170°–190° C. Helium was added to maintain a pressure of 1000 psig. The nature of the zeolite product was determined by X-ray diffraction analyses.

TABLE I

| Ex. | $M_2O/SiO_2$ | $R^+/Na^+ + R^+$ | Zeolite |
|---|---|---|---|
| 1 | 0.56 | 0 | Analcite |
| 2 | 0.61 | 0.09 | Analcite |
| 3 | 0.67 | 0.17 | Analcite + Mordenite |
| 4 | 0.77 | 0.28 | Mordenite Only |
| 5 | 0.61 | 0 | Analcite |
| 6 | 0.67 | 0 | Analcite |
| 7 | 0.77 | 0 | Analcite |

The above results and particularly those of Examples 1–4 show that the product shifts from a dense structure, i.e. analcite, to a large pore zeolite, i.e. mordenite, as increasing amounts of the polymer are added to the reaction mixture. Addition of equivalent amounts of sodium bromide (in place of the polymer) had no such effect, with analcite always being the product.

Chemical analysis of the product mordenite established the following composition:

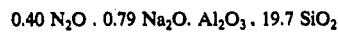

$0.40 N_2O . 0.79 Na_2O . Al_2O_3 . 19.7 SiO_2$

The mole ratio of carbon/nitrogen was 6.8, as compared with 5 in the polymer showing some decomposition of the polymer at the high mordenite crystallization temperature. The product mordenite was stable to calcination at 550° C. for 16 hours yielding a product which readily sorbed cyclohexane (6.3% at 25° C. and 60 mm Hg).

EXAMPLES 8–24

Reaction mixtures were prepared by mixing a 30 weight percent colloidal silica sol with aqueous solutions of the above polymer and of sodium hydroxide and sodium aluminate. The reaction mixture had a composition defined by the following mole ratios:

$OH^-/SiO_2 = 1.2$
$H_2O/OH^- = 17$

The mole ratios $SiO_2/Al_2O_3$, $M_2O/SiO_2$ and $(R^+/Na^+ + R^+)$ were varied as shown in Table II below. The latter ratios have the same significance as above. Crystallization was realized after the specified number of days at 90° C. with occasional mixing in polypropylene containers. Results are shown below.

Table II

| Ex. | Days | $SiO_2/Al_2O_3$ | $M_2O/SiO_2$ | $R^+/Na^+ + R^+$ | Zeolite*** |
|---|---|---|---|---|---|
| 8 | 3 | 15 | 0.56 | 0 | X(+P) |
| 9 | 3 | 15 | 0.61 | 0.09 | Gmelinite Only |
| 10 | 13 | 15 | 0.67 | 0.17 | Gmelinite Only |
| 11 | 9 | 30 | 0.56 | 0 | Y + P |
| 12 | 9 | 30 | 0.57 | 0.01 | Gmelinite + Chabazite |
| 13 | 5 | 30 | 0.61 | 0.09 | Gmelinite + Chabazite |
| 14 | 9 | 30 | 0.67 | 0.17 | Gmelinite Only |
| 15 | 60 | 30 | 0.77 | 0.28 | Amorphous |
| 16 | 13 | 75 | 0.56 | 0 | P |
| 17 | 13 | 75 | 0.57 | 0.01 | Gmelinite + Chabazite |
| 18 | 13 | 75 | 0.61 | 0.09 | Gmelinite + Chabazite |
| 19 | 20* | 30 | 0.38 | 0 | Y + P |
| 20 | 60* | 30 | 0.39 | 0.01 | Amorphous |
| 21 | 60* | 30 | 0.43 | 0.09 | Amorphous |
| 22 | 4** | 30 | 0.76 | 0 | P |
| 23 | 7** | 30 | 0.81 | 0.07 | Gmelinite + Chabazite + P |
| 24 | 7** | 30 | 0.86 | 0.13 | Gmelinite + Chabazite + P |

*$OH^-/SiO_2 = 0.68$
**$OH^-/SiO_2 = 1.5$, $H_2O/OH^- = 12$
***When polymer was replaced by an equivalent amount of NaBr, only X, Y and P were obtained.

From the above tabulated results it will be seen that in reaction mixtures normally yielding zeolites Y and P, even small quantities of the polymer direct crystallization to zerolites of the gmelinite-type. Significantly, on increasing the amount of polymer, product zeolites are obtained which show the X-ray pattern expected for a chabazite-free gmelinite. The latter possesses sorptive properties substantially different from available natural and synthetic gmelinites. These latter zeolites in their sorption of hydrocarbons exhibit small-pore properties characteristic of approximately 4 Angstrom pore size rather than the large-pore behavior characteristic of approximately 7 Angstrom pore size which would be expected from structural data. This sorption behavior is attributed to chabazite stacking faults, which block or restrict the large gmelinite channels. The present method for synthesis of gmelinite results in elimination of such fault planes.

The product of Example 14 analyzed as follows: 0.43 $N_2O . 0.67 Na_2O . Al_2O_3 . 7.05 SiO_2$ and sorbed 7.3% cyclohexane (25° C., 60 mm Hg), exhibiting an initial rapid sorption of 3.7% and reaching the limiting capacity of 7.3% in about an hour. By way of composition, sodium chabazite and natural gmelinite (Na, Ca-form) sorb a total of 0.8 and 1.0% cyclohexane respectively.

The capability of gmelinite zeolites prepared in accordance with the method of this invention to sorb comparatively large amounts of cyclohexane is attributable to the absence of chabazite stacking faults therein.

Crystallization was obtained at 180° C. and at 90° C. as set forth in the following Table III:

TABLE III

| Example | Temp. ° C. | Days | $M_2O/SiO_2$ | $R^+/(R^+ + Na^+)$ | Zeolite | Product $SiO_2/Al_2O_3$ |
|---|---|---|---|---|---|---|
| 29 | 180 | 6 | 0.62 | 0.06 | Analcite | 6.0 |
| 30 | 180 | 6 | 0.65 | 0.11 | Mordenite + Analcite + Unknown | 16.7 |
| 31 | 180 | 6 | 0.72 | 0.19 | Mordenite + Unknown | 21.1 |
| 32* | 180 | 6 | 0.61 | 0.06 | Mordenite | 23.2 |
| 33 | 90 | 8 | 0.62 | 0 | Y + P | 4.3 |
| 34 | 90 | 8 | 0.62 | 0.06 | Y + P | 5.2 |
| 35 | 90 | 55 | 0.65 | 0.11 | Gmelinite + Mordenite + P | 7.5 |
| 36 | 90 | 75 | 0.72 | 0.19 | Amorphous | — |
| 37* | 90 | 42 | 0.61 | 0.06 | Mordenite + P | 14.3 |
| 38** | 90 | 75 | 0.68 | 0.05 | Mordenite | 18.6 |

*Reaction mixture had $SiO_2/Al_2O_3 = 62$.
**Reaction mixture had $OH^-/SiO_2 = 0.60$, $H_2O/OH^- = 34$.

EXAMPLES 25-28

A reaction mixture was prepared having the following composition: $SiO_2/Al_2O_3 = 50$, $OH^-/H_2O = 1.2$, $H_2O/OH^- = 17$, $M_2O/SiO_2 = 0.6$ and $R^+/(R^+ + Na^+) = 0.1$. Preparation entailed mixing 30% colloidal silica sol with aqueous solution of polymer and of NaOH/-NaAlO$_2$. Crystallization was obtained after placing in an oven at 80°-90° C. with periodic sampling. Based on X-ray diffraction analyses, the solid products contained the following contents of crystalline zeolite Y at 3, 7 and 13 days crystallization time:

| Ex. | Polymer | 3 Days | 7 Days | 13 Days |
|---|---|---|---|---|
| 25 | None | 34% | 16% | 0 |
| 26 | $-N(CH_3)_2-(CH_2)_2-N(CH_3)_2-(CH_2)_6-$ | 32% | 10% | 2% |
| 27 | $-N(CH_3)_2-(CH_2)_6-N(CH_3)_2-(CH_2)_4-$ | 81% | 60% | 27% |
| 28 | $-N(CH_3)_2-(CH_2)_6-N(CH_3)_2-(CH_2)_6-$ | 50% | 29% | 0 |

Polymers were added as the bromides.

The remainder of the solid was essentially zeolite P. As will be evident, maximum formation of zeolite Y was observed with the polymer used in Example 27 at all three sample times.

EXAMPLES 29-38

In these examples, the following polymer was employed:

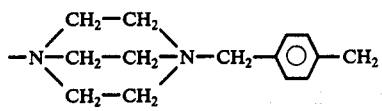

The polymer was added as the bromide.

A reaction mixture utilizing this polymer was prepared by mixing 30% colloidal silica sol with aqueous solutions of the polymer and of NaOH/NaAlO$_2$. The reaction mixture had the following composition: $SiO_2/Al_2O_3 = 31$, $OH^-/SiO_2 = 1.1$ and $H_2O/OH^- = 20$.

The unknown component in certain of the above zeolite products was present in only minor amount.

EXAMPLE 39

One property which can distinguish a polymer from a monomer is the increase in viscosity of aqueous solutions of the former with increasing concentration. Correspondingly, a highly purified polymer was prepared for viscosity measurements.

More particularly, 177.6 grams of 1,4-dibromobutane (0.82 moles) was dropwise to a solution of 92.2 grams of 1,4-diazabicyclo [2.2.2] octane (0.82 moles) in 800 ml. of dimethylsulfoxide at 45° C. with stirring. As the reagents were mixed, the temperature increased to about 80° C. When mixing was complete, the temperature was raised to about 110° C. and was maintained for 4 hours. The mixture was cooled, and the precipitated polymer was filtered and repeatedly extracted and slurried with ether until no odor of dimethylsulfoxide was detectable. The polymer was a free flowing, water soluble, light yellow powder. On elemental analysis, sulfur was 0.51 percent. The analysis was as follows, after correction, for residual dimethylsulfoxide:

|  | Calculated | Observed |
|---|---|---|
| Carbon | 36.59 | 33.80 |
| Hydrogen | 6.10 | 7.10 |
| Nitrogen | 8.53 | 8.18 |
| Bromine | 48.78 | 50.92 |

Kinematic viscosity data at 100° F. were obtained for aqueous solutions of the above polymer and for corresponding solutions of the monomeric diiodide of 1,4-dimethyl diazabicyclo [2.2.2] octane. The data, with viscosity in centistokes and concentrations in grams per 100 cc 0.4 MKBr solution, were as follows:

| | Kinematic Viscosity | |
|---|---|---|
| Concentration | Polymer | Monomer |
| 0.5 | 0.6788 | 0.68 |
| 0.7 | 0.72 | — |
| 0.8 | 0.73 | — |
| 1.0 | 0.74 | 0.67 |
| 1.2 | 0.7526 | — |
| 1.5 | 0.7406 | 0.68 |
| 1.7 | 0.7579 | — |
| 2.0 | 0.7787 | 0.674 |

In the absence of organic compounds, kinematic viscosities of 0.68 centistokes were measured.

EXAMPLE 40

The polymer used in these experiments was prepared from N, N, N', N'-tetramethylbenzidine and α, α'-dibromo-p-xylene.

More particularly, 100 grams of the dibromide (0.38 moles) in 1.5 liters of dimethylformamide was added to a solution of 93 grams tetramethylbenzidine (0.38 moles) in 3 liters of the same solvent. The temperature was maintained below 50° C., and the mixture was left stirring for a week. A precipitate formed, which was filtered, washed with ether, and air dried.

A reaction mixture was prepared having the following composition: $SiO_2/Al_2O_3 = 62$, $OH^-/SiO_2 = 0.84$, $H_2O/OH^- = 19$, and $Na_2O/SiO_2 = 0.4$. Polymer was added such that the molar ratios of $R^+/R^+ + Na^+$ were varied in the range of 0.01 to 0.10. Preparation entailed mixing 30% colloidal silica sol with a slurry of the above polymer in an aqueous solution of $NaOH/NaAlO_2$. Crystallization was obtained after placing in an oven at 80°–90° C. with periodic sampling. After 14–23 days products were filtered and analyzed by X-ray diffraction. The zeolite beta was identified in the product mixtures.

EXAMPLES 41 and 42

These examples will show what happens when a mixture of paraffins and aromatics is contacted with zeolites prepared according to this invention. For this example, the products of Examples 4 and 14 were converted to the ammonium form by conventional methods known to the art. After calcination for 2 hours at 500° C., catalysts were loaded into a reactor and tested as follows:

Reaction conditions were 800° F., WHSV 2–3, $H_2$:HC = 3.7, 200 psig. The feed was a mixture of n-hexane, 3-methylpentane, 2,3-dimethylbutane, benzene, and toluene in equal weights. After 5 hours on-stream, products were sampled and analyzed to give the following results:

| Example | 41 | 42 |
|---|---|---|
| Zeolite | Mordenite | Gmelinite |
| Synthesis | Example 4 | Example 14 |
| Conversion, percent | | |
| 2,3-dimethylbutane | 17 | 28 |
| 3-methylpentane | 21 | 14 |
| n-hexane | 73 | 6 |

Of the hexanes cracked, 8% and 1% were observed as aromatic alkyl side chains with the mordenite and gmelinite, respectively.

Preferential conversion of the normal paraffins can be desirable in post-reforming applications since these straight chain isomers are the low-octane components of a typical reformate. Such a conversion pattern is unusual for a mordenite catalyst, however. A conventional mordenite synthesized in the absence of organic quaternary ammonium cations, exhibited preferential conversion of branched iosmers, 17, 6 and 7% for 2,3-DMB, 3-MP, and N-C6, respectively. Such preferential conversion of branched isomers, as observed with the gmelinite sample, commonly indicates a large-pore zeolite more suitable for cracking, isomerization, and hydrocracking applications.

The gmelinite employed in this Example exhibited an x-ray diffraction pattern showing the following significant lines:

| I/Io | d | I/Io |
|---|---|---|
| 12.0 | 37 | 4.50 | 56 |
| 7.74 | 32 | 4.11 | 100 |
| 6.90 | 6 | 3.97 | 13 |
| 5.96 | 21 | 3.43 | 17 |
| 5.13 | 29 | 3.23 | 52 |
| 5.05 | 27 | 3.13 | 4 |
| 4.64 | 9 | | |

The pattern contained no trace of any peak at d-spacings of 9.39, 5.58 or 4.35 A, indicating that the gmelinite was entirely free of chabazite.

EXAMPLES 43 – 52

The effect of a variety of polymers upon the synthesis of zeolite ZSM-12 was investigated. The various runs were performed under static autoclave conditions at 180° C employing silica sol as source of silicate, the reaction mixture silica/alumina ratio being 28 – 30.

Five different polymers were employed. In Table IV, which sets out the results of the runs, the designations in the polymer column refer to the following materials:

"4-PX": a polymer of α, α'-dibromo-p-xylene and N, N, N', N'tetramethyl 1,4-buradiamine having a molecular weight of about 5500.

"6-PX": a polymer of α, α'-dibromo-p-xylene and N, N, N', N'-tetramethyl-1,6-hexadiamine having a molecular weight of about 9500.

"Dab-4": the polymer of Examples 1 to 7.

"Dab-10": similar to Dab 4, the dibromo-butane monomer being replaced by 1,10 dibromodecane; molecular weight about 5500.

"6-4": a polymer of N, N, N', N'-tetramethyl-1,6-hexadiamine with 1,4-dibromobutane, having a molecular weight of about 6000.

TABLE IV

| | REACTION MIXTURE | | | | | | PRODUCT | | |
|---|---|---|---|---|---|---|---|---|---|
| EXAMPLE | $H_2O/OH$ | $OH/SiO_2$ | $M_2O/SiO_2$ | $R_2O/M_2O$ | POLYMER | DAYS | Zeolite | $SiO_2/Al_2O_3$ | $R_2O/Al_2O_3$ |
| 43 | 92 | 0.72 | 0.67 | 0.46 | 4-PX | 7 | ZSM-12 | 29.7 | 0.90 |
| 44 | " | " | " | " | " | " | " | 29.9 | 0.75 |
| 45 | " | 0.36 | " | " | " | 14 | amorphous | — | — |
| 46 | " | " | 0.34 | " | " | 13 | " | 25.6 | 0.57 |
| 47 | " | " | " | 0.23 | " | 14 | ZSM-12 | 26.2 | 0.60 |
| 48 | 92 | 0.72 | 0.67 | 0.46 | 6-PX | 7 | ZSM-12 | 34.7 | 2.43 |
| 49 | " | " | " | " | dab-4 | 7 | " | 25.5 | 0.92 |
| 50 | " | " | " | " | " | 7 | "(a) | 26.0 | 1.11 |
| 51 | " | " | " | " | 6 | 7 | (b) | 23.3 | 0.71 |
| 52 | " | " | " | " | dab-10 | 7 | amorphous | 25.8 | 2.36 |

(a)Contains mordenite
(b)Unidentified crystalline material, suspected to contain ZSM-12.

Attempts to crystallise ZSM-12 from similar reaction mixtures employing monomeric cations structurally related to the polymer components were unsuccessful, no doubt due to the fact that these reaction mixtures are not highly conducive to the formation of this particular zeolite. Also note-worthy is the fact that the ZSM-12 products obtained were at the lower end of the range of silica/alumina ratio for ZSM-12; the polymer thus provides a reliable route to directing crystallisation of ZSM-12 of silica/alumina ratio in the range 20 – 30.

EXAMPLES 53 – 62

The effect of a variety of polymers upon the synthesis of zeolite Y was investigated. The various runs were performed under static autoclave conditions at 85° C, employing silica sol as source of silicate, the reaction mixture silica/alumina ratio being 28.

The polymer designations in Table V, in which the results are set out, have the following significance:
"6 - 4": as in Examples 43 – 52
"6 - 2" and "6-6": as "6-4", but employing as the second monomer, respectively, symmetrical dibromoethane and 1,6-dibromohexane.

TABLE V

| | REACTION MIXTURE | | | | | | PRODUCT | | |
|---|---|---|---|---|---|---|---|---|---|
| EXAMPLE | $H_2O/OH$ | $OH/SiO_2$ | $M_2O/SiO_2$ | $R_2O/M_2O$ | POLYMER | DAYS | ZEOLITE | $SiO_2/Al_2O_3$ | $R_2O/Al_2O_3$ |
| 53 | 20 | 1.17 | 0.63 | — | (Na) | 3 | 75%Y | 3.81 | 0.002 |
| 54 | " | " | " | 0.08 | 6-2 | 4 | 82%Y | 3.86 | 0.01 |
| 55 | " | " | " | 0.08 | 6-6 | 7 | 85%Y | 3.94 | 0.01 |
| 56 | 20 | 1.17 | 0.70 | — | (Na) | 6 | 75%Y | 3.94 | 0.003 |
| 57 | " | " | " | 0.17 | 6-2 | 6 | 72%Y | 4.49 | 0.03 |
| 58 | " | " | " | 0.17 | 6-6 | 6 | 68%Y | 4.13 | 0.01 |
| 59 | 40 | 1.17 | 0.70 | — | (Na) | 10 | 26%Y[a] | 4.41 | 0.002 |
| 60 | " | " | " | 0.17 | 6-2 | 10 | 49%Y | 4.88 | 0.03 |
| 61 | " | " | " | " | 6-4 | 9 | 5%Y[a] | 4.64 | 0.02 |
| 62 | " | " | " | " | 6-6 | 10 | 54%Y | 4.50 | 0.01 |

[a] Contains zeolite P.

From Examples 53, 56 and 59 in which no polymer was employed (sodium being the only cation present) it can be seen that use of the polymer increased product silica/alumina ratio in every case.

We claim:

1. A process of synthesising a crystalline aluminosilicate zeolite from an aqueous reaction mixture containing sources of silicate, of aluminate and of cations in quantity at least equivalent to the aluminum in said mixture, characterized by the fact that said source of cations comprises a polymer selected from ionenes and ionomers of such equivalent weight, and in such quantity, as to balance the negative charge on 1 to 100 percent of the aluminum-containing tetrahedra of the resulting zeolite with positively charged polymer nitrogen atoms.

2. A process according to claim 1 wherein polymer nitrogen atoms balance the negative charge on 10 to 90 percent of the aluminum-containing tetrahedra of the resulting zeolite.

3. A process according to claim 1 wherein polymer nitrogen atoms balance the negative charge on 40 to 70 percent of the aluminum-containing tetrahedra of the resulting zeolite.

4. A process containing to claim 1 wherein the ionene is the reaction product of an α, ωdihalide having 3 to 20 carbon atoms and a ditertiary amine having 2 to 20 carbons atoms separating the nitrogen atoms and from 1 to 6 carbon atoms in each alkyl substituent, and has a degree of polymerization of 2 to 1000.

5. A process according to claim 4 wherein the ditertiary amine is 1,4-diazabicyclo [2.2.2] octane.

6. A process according to claim 4 wherein the ditertiary amine is N, N, N', N'-tetramethyl benzidine.

7. A process according to claim 4 wherein the ditertiary amine is selected from 1,2-bis (4-pyridyl)ethylene and 4,4-bipyridyl.

8. A process according to claim 4 wherein the dihalide is benzylic.

9. A process according to claim 4 wherein the dihalide is a bibromide.

10. A process according to claim 1 wherein the polymer is an ionomer the positively charged nitrogen atoms of which form part of a pyridinium group.

11. A process according to claim 10 wherein the ionomer is a poly (2-) or (4-alkenylpyridinium) salt.

12. A process according to claim 11 wherein said salt is poly (2-) or (4-vinyl pyridinium).

13. A process according to claim 1 wherein the polymer is an ionomer the positively charged nitrogen atoms of which are quaternary.

14. A process according to claim 13 wherein the ionomer is a trimethylamine - quaternized poly (epichlorohydrin).

15. A process according to claim 1 wherein polymer nitrogen atoms acquire charge as a consequence of the presence of the polymer in the reaction mixture.

16. A process according to claim 1 wherein the polymer has a molecular weight of at least 300.

17. A process according to claim 16 wherein the polymer has a molecular weight in the range 300 to 18,000.

18. A process according to claim 8 wherein the reaction mixture has the composition:
$SiO_2/Al_2O_3 = 20 - 40$
$H_2O/OH = 50 - 150$
$OH/SiO_2 = 0.2 - 0.8$
$M_2O/SiO_2 = 0.2 - 0.7$
$R_2O/M_2O = 0.2 - 0.5$
in which R denotes equivalents of polymer cation, M denotes equivalents of total cation (including R), and said zeolite is ZSM-12.

19. A process according to claim 4 wherein the reaction mixture has the composition:
$SiO_2/Al_2O_3 = 15 - 40$
$H_2O/OH = 10 - 50$
$OH/SiO_2 = 0.5 - 1.2$
$M_2O/SiO_2 = 0.4 - 1.0$
$R_2O/M_2O = 0.1 - 0.5$
in which R denotes equivalents of polymer cation, M denotes equivalents of total cation (including R), and said zeolite is mordenite.

20. A process according to claim 5 wherein the reaction mixture has the composition:
$SiO_2/Al_2O_3 = 10 - 75$
$H_2O/OH = 10 - 50$
$OH/SiO_2 = 0.7 - 1.5$
$M_2O/SiO_2 = 0.3 - 0.9$
$R_2O/M_2O = 0.01 - 0.3$
in which R denotes equivalents of polymer cation, M denotes equivalents of total cation (including R), and said zeolite is gmelinite.

* * * * *